(12) United States Patent
Shih et al.

(10) Patent No.: US 10,003,791 B2
(45) Date of Patent: Jun. 19, 2018

(54) ILLUMINATION APPARATUS AND FIELD-OF-VIEW CALIBRATION METHOD THEREOF

(71) Applicant: VIVOTEK INC., New Taipei (TW)

(72) Inventors: Li-Shan Shih, New Taipei (TW); Yi-Hsin Yeh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days. days.

(21) Appl. No.: 15/372,404

(22) Filed: Dec. 8, 2016

(65) Prior Publication Data

US 2017/0171541 A1 Jun. 15, 2017

(30) Foreign Application Priority Data

Dec. 11, 2015 (TW) .............................. 104141653 A

(51) Int. Cl.
| | |
|---|---|
| *H04N 17/00* | (2006.01) |
| *G03B 15/03* | (2006.01) |
| *H04N 5/225* | (2006.01) |
| *G06K 9/62* | (2006.01) |
| *G03B 43/00* | (2006.01) |
| *G08B 13/196* | (2006.01) |

(52) U.S. Cl.
CPC ........... *H04N 17/002* (2013.01); *G03B 15/03* (2013.01); *G03B 43/00* (2013.01); *G06K 9/6201* (2013.01); *G08B 13/196* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 6,507,711 | B2* | 1/2003 | Maruyama | G03B 17/48 348/333.11 |
| 8,154,650 | B2* | 4/2012 | Tsai | G06F 3/0488 348/371 |
| 9,674,436 | B2* | 6/2017 | Crane | H04N 5/23241 |
| 9,762,786 | B2* | 9/2017 | Okada | H04N 5/2256 |
| 2017/0171541 | A1* | 6/2017 | Shih | H04N 17/002 |

FOREIGN PATENT DOCUMENTS

TW M463367 U 10/2013

* cited by examiner

*Primary Examiner* — W B Perkey
(74) *Attorney, Agent, or Firm* — Winston Hsu

(57) ABSTRACT

An illumination apparatus is applied for providing illumination to a photographic device having a photographic field-of-view. The illumination apparatus includes an illumination device and a calibration photographic device. The illumination device is pivoted to a side of the photographic device and has an illumination field-of-view. The calibration photographic device has a calibration photographic field-of-view and is connected to the illumination device to make the calibration photographic field-of-view substantially overlap with the illumination field-of-view and make the calibration photographic device move together with the illumination device. The calibration photographic field-of-view at least partially overlaps with the photographic field-of-view. Accordingly, the present invention could improve convenience of the photographic device in mounting the illumination device.

9 Claims, 5 Drawing Sheets

ILLUMINATION APPARATUS AND FIELD-OF-VIEW CALIBRATION METHOD THEREOF

BACKGROUND OF THE INVENTION

1. Field of the Invention

The present invention relates to an illumination apparatus and a field-of-view calibration method thereof, and more specifically, to an illumination apparatus for overlapping an illumination field-of-view of an illumination device with a calibration photographic field-of-view of a calibration photographic device and adjusting the calibration photographic field-of-view of the calibration photographic device moving together with the illumination device to at least partially overlap with a photographic field-of-view of a photographic device and a field-of-view calibration method thereof.

2. Description of the Prior Art

In general, a photographic device (e.g. a surveillance camera) utilizes an illumination apparatus (e.g. an infrared light emitting diode) to provide auxiliary light for capturing clear images even if the photographic device is operated in a dark environment (e.g. for road environmental surveillance at night). A conventional illumination design is to mount the illumination apparatus under the photographic device and rotate the illumination apparatus to a position where an illumination field-of-view of the illumination apparatus overlaps with a photographic field-of-view of the photographic device, so that light provided by the illumination apparatus could cover an image capturing range of the photographic device for providing sufficient illumination to a surveillance region (e.g. road at night, parking lot, etc.) monitored by the photographic device.

However, during the aforesaid adjusting process for making the illumination field-of-view of the illumination apparatus overlap with the photographic field-of-view of the photographic device, a user roughly estimates a rotating angle of the illumination apparatus by his naked eyes according to the practical mounting condition, and then determines whether light of the illumination apparatus is incident to the image capturing range of the photographic device according to clarity of images captured by the photographic device. If the illumination apparatus utilizes an infrared light emitting diode as a light source, the user could not see the illumination range of the illumination apparatus clearly at the daytime. Thus, it may cause a time-consuming and strenuous illumination adjusting process and may cause the user much inconvenience in mounting the illumination apparatus on the photographic device.

SUMMARY OF THE INVENTION

The present invention provides an illumination apparatus applied for providing illumination to a photographic device. The photographic device has a photographic field-of-view. The illumination apparatus includes an illumination device and a calibration photographic device. The illumination device is pivoted to a side of the photographic device and has an illumination field-of-view. The calibration photographic device has a calibration photographic field-of-view and is connected to the illumination device to make the calibration photographic field-of-view substantially overlap with the illumination field-of-view and make the calibration photographic device move together with the illumination device. The calibration photographic field-of-view at least partially overlaps with the photographic field-of-view.

The present invention further provides a field-of-view calibration method applied to illumination calibration of an illumination device. The illumination device is pivoted to a side of a photographic device. The field-of-view calibration method includes connecting a calibration photographic device to the illumination device to make a calibration photographic field-of-view of the calibration photographic device substantially overlap with an illumination field-of-view of the illumination device and make the calibration photographic device move together with the illumination device. The field-of-view calibration method includes further includes utilizing a comparing unit to compare an image captured by the photographic device with at least one image captured by the calibration photographic device, so as to assist the illumination device and the calibration photographic device to rotate together relative to the photographic device to a position where the calibration photographic field-of-view at least partially overlaps with the photographic field-of-view.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
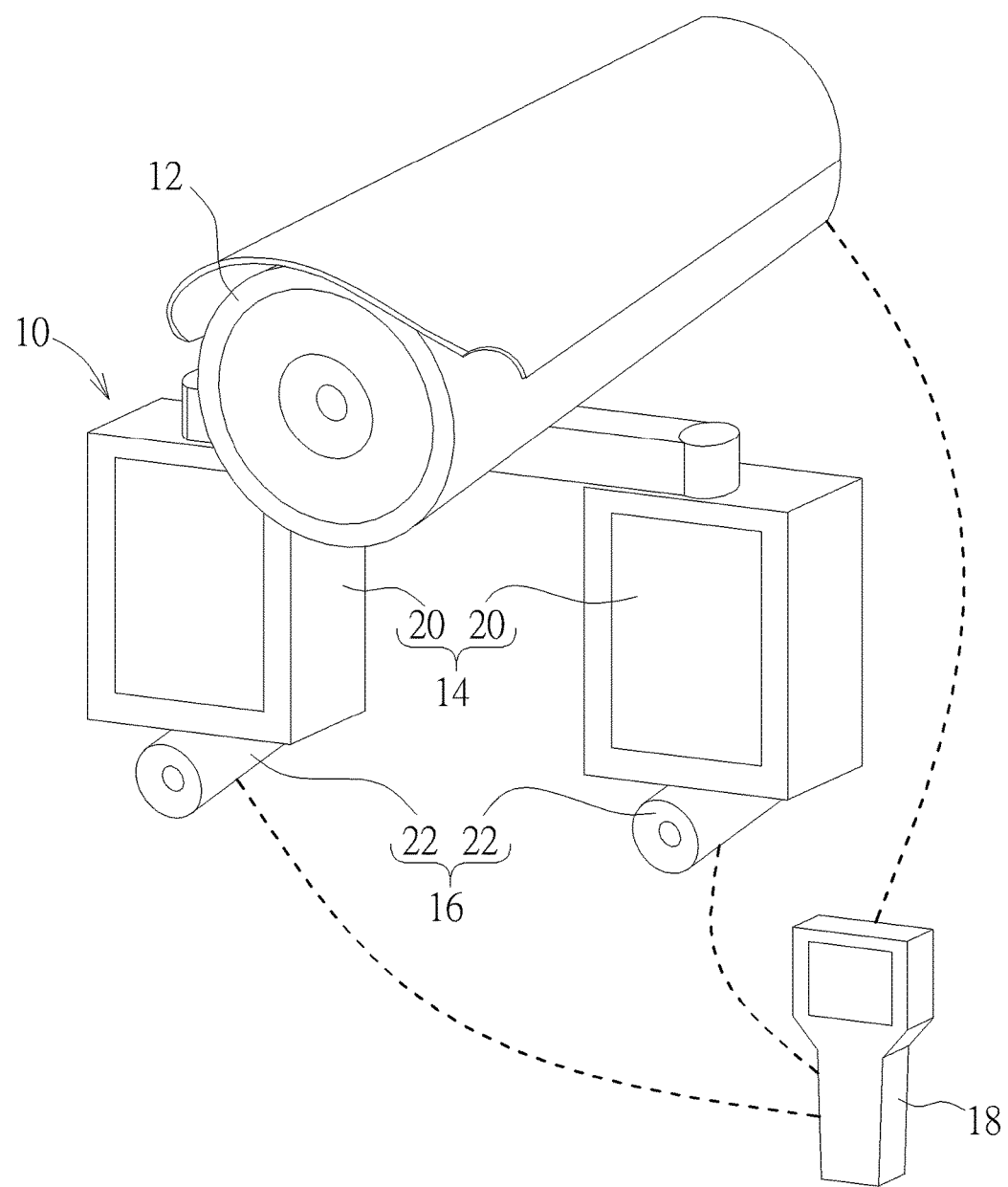
FIG. 1 is a diagram of an illumination apparatus being disposed at a side of a photographic device according to an embodiment of the present invention.

Please refer to FIG. 1, which is a diagram of an illumination apparatus 10 being disposed at a side of a photographic device 12 according to an embodiment of the present invention. As shown in FIG. 1, the photographic device 12 could preferably be a camera device for image surveillance (e.g. IP camera). The illumination apparatus 10 could be disposed at the side of the photographic device 12 (preferably being disposed under the photographic device 12, but not limited thereto, meaning that the illumination apparatus 10 could be disposed at a left side of the photographic device 12, a right side of the photographic device 12, or above the photographic device 12 in another embodiment), and could include an illumination device 14 and a calibration photographic device 16. The illumination device 14 is rotatably connected to the photographic device 12 for providing illumination light, so that the photographic device 12 could capture clear images by the illumination light even in a dark environment (e.g. for road environmental surveillance at night). The calibration photographic device 16 is connected to the illumination device 14 for moving together with the illumination device 14, so that the calibration photographic device 16 could rotate cooperatively with the illumination device 14 relative to the photographic device 12.

To be more specific, in this embodiment, the illumination device 14 could include at least two illumination units 20 (two shown in FIG. 1, but not limited thereto). The illumination unit 20 could be a light emitting unit (preferably an infrared light emitting diode, but not limited thereto, meaning that the illumination unit 20 could be other type of light emitting diode (e.g. a visible light emitting diode) in another embodiment) commonly applied to a surveillance camera. The calibration photographic device 16 could include at least two calibration cameras 22 (two shown in FIG. 1, but not limited thereto). The calibration camera 22 could be a camera device for capturing images and could be connected to the corresponding illumination unit 20 for moving together with the corresponding illumination unit 20, so that the calibration camera 22 could rotate cooperatively with the corresponding illumination unit 20 relative to the photographic device 12.

As for connecting the calibration camera 22 to the illumination unit 20, the present invention could adopt a conventional connection design, such as a screwing locking design or a structural engagement design (e.g. hook-and-hole engagement) or could adopt the design for disposing the calibration camera 22 in the illumination unit 20, and the related description is omitted herein since it is commonly seen in the prior art. In practical application, the calibration camera 22 could be detachably connected to a side of the corresponding illumination unit 20 (preferably being disposed under the illumination unit 20, but not limited thereto, meaning that the calibration camera 22 could be disposed at a left side of the illumination unit 20, a right side of the illumination unit 20, or above the illumination unit 20 in another embodiment), so that a user could detach the calibration camera 22 from the illumination unit 20 for reducing the overall mounting volume of the illumination apparatus 10 and the photographic device 12 after completing the illumination calibration process. Furthermore, as shown in FIG. 1, the illumination apparatus 10 could further include a comparing unit 18 coupled to the photographic device 12 and the calibration camera 22 in a wired or wireless connection manner. In this embodiment, the comparing unit 18 could a hand-held monitor device for displaying the images captured by the calibration camera 22 and the photographic device 12 for image comparison.

In such a manner, the illumination unit 20 and the calibration camera 22 could rotate together relative to the photographic device 12 to a position where a calibration photographic field-of-view of the calibration camera 22 at least partially overlaps with a photographic field-of-view of the photographic device 12 according to a comparison result of the images displayed by the comparing unit 18 and the images captured by the photographic device 12. To be noted, the comparing unit 18 is not limited to the hand-held monitor device, meaning that the comparing unit 18 could be hardware, software, or firmware having an image comparison function in another embodiment. As for which design is utilized, it depends on the practical application of the illumination apparatus 10.

Figure 2:
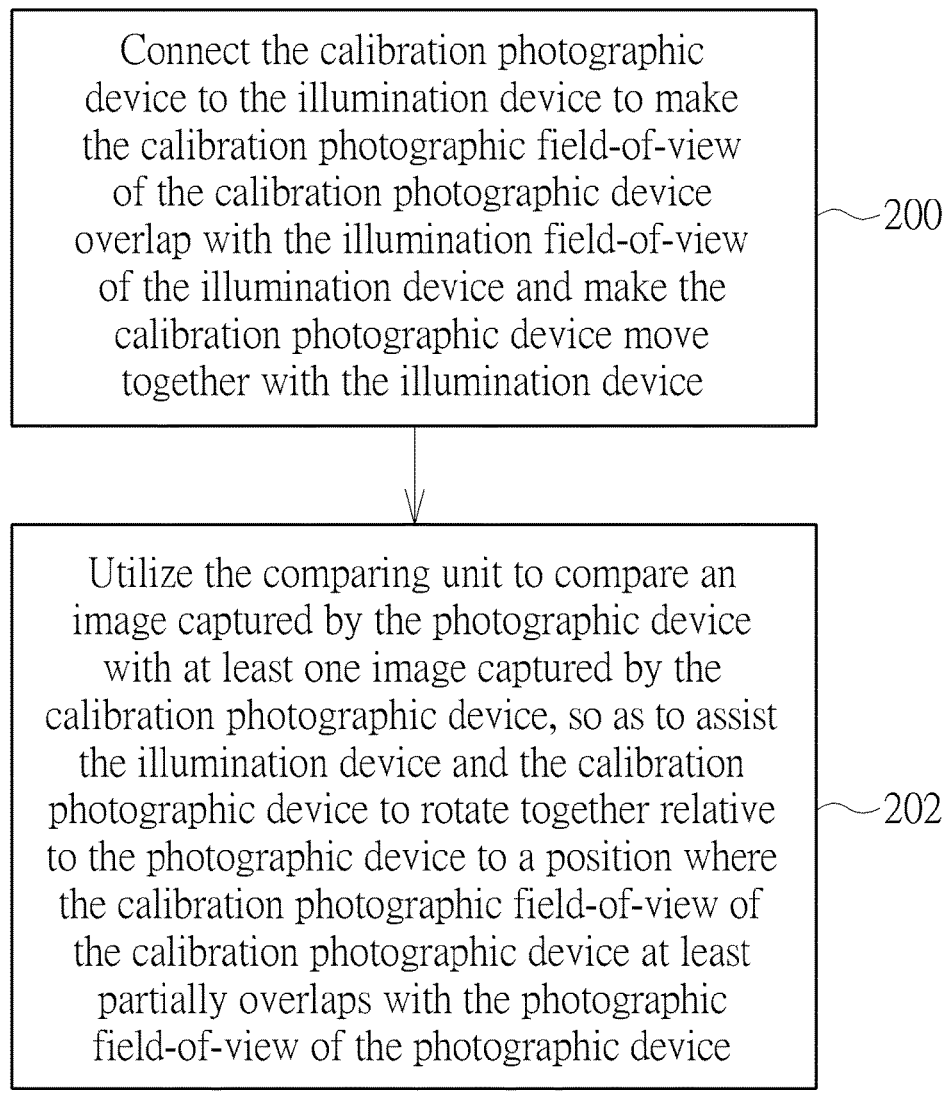
FIG. 2 is a flowchart of a field-of-view calibration method according to an embodiment of the present invention.
Figure 3:
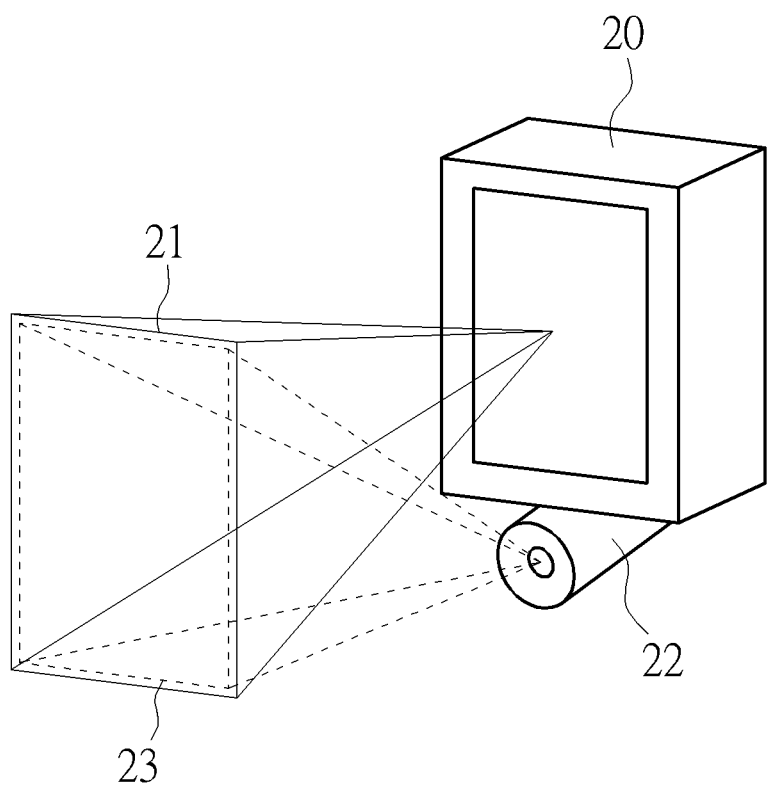
FIG. 3 is a diagram of a calibration camera being disposed under an illumination unit.
Figure 4:
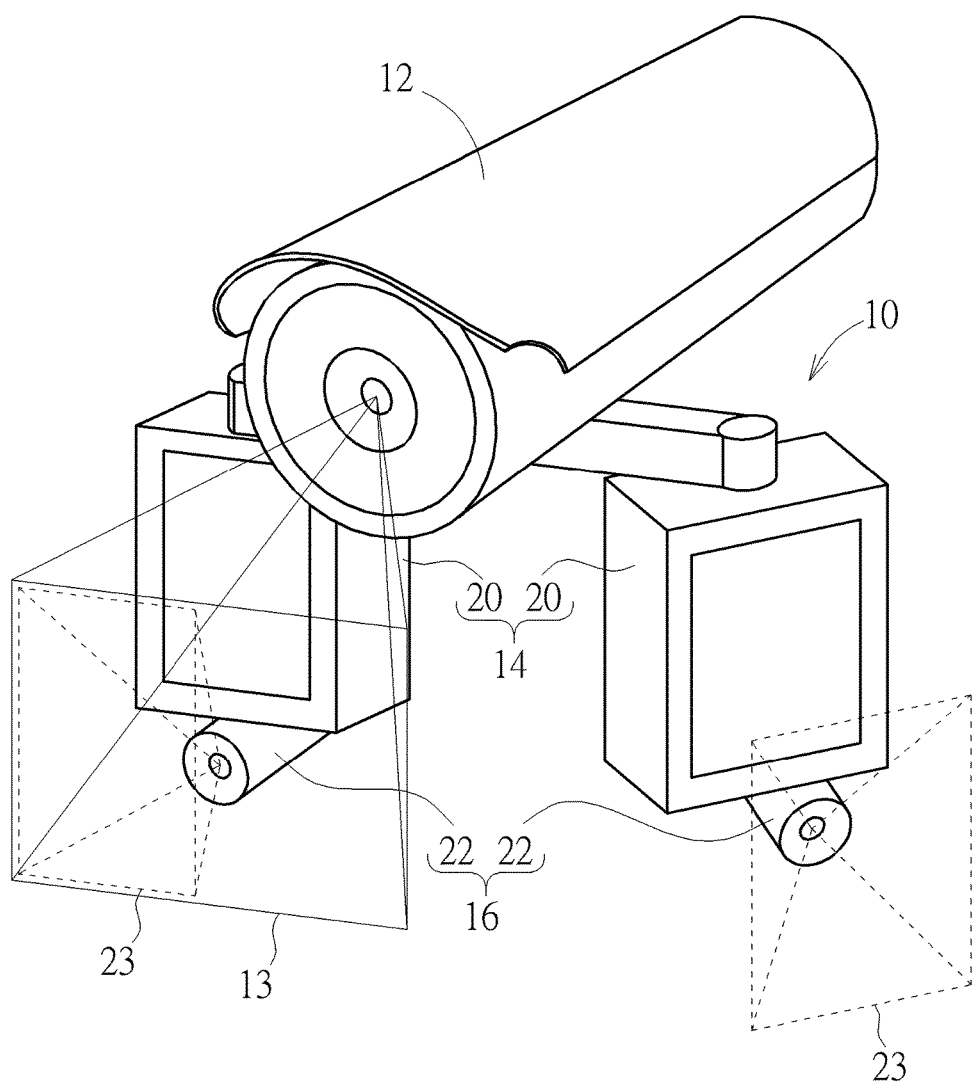
FIG. 4 is a diagram of the illumination unit in FIG. 1 being deflected relative to the photographic device.
Figure 5:
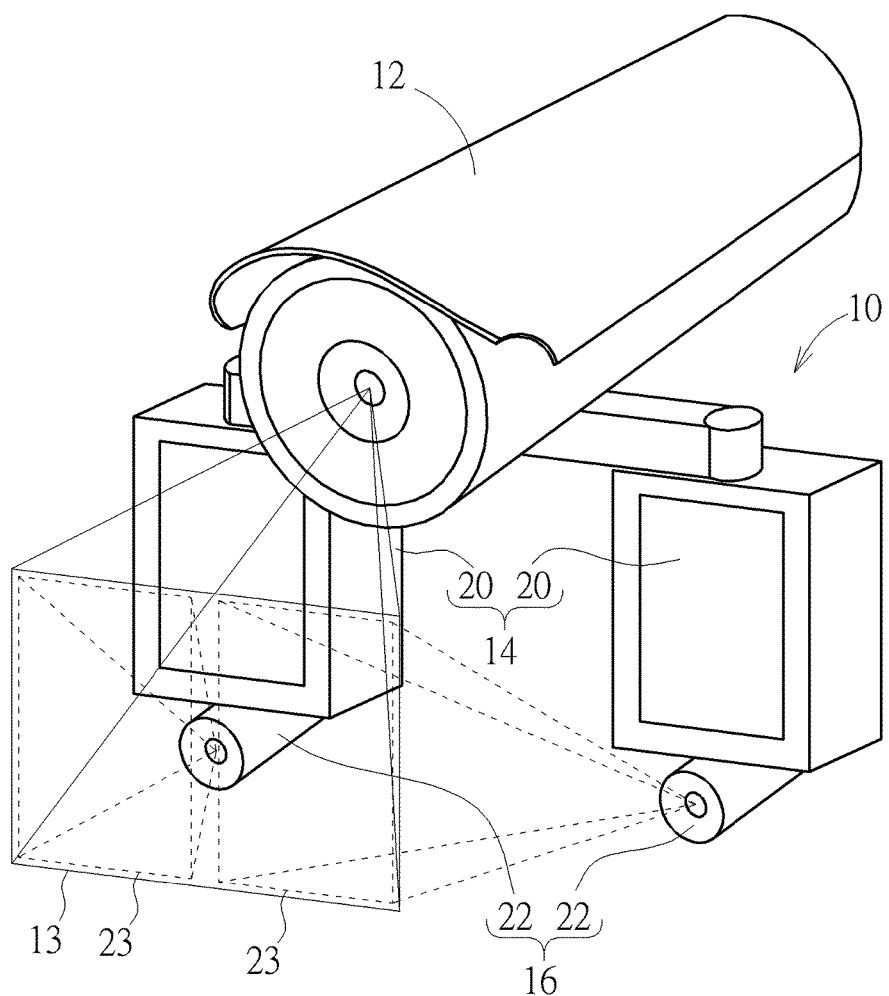
FIG. 5 is a diagram of a calibration photographic field-of-view of a calibration photographic device overlapping with a photographic field-of-view of the photographic device.

More detailed description for the field-of-view calibration method of the illumination apparatus 10 is provided as follows. Please refer to FIG. 1, FIG. 2, FIG. 3, FIG. 4, and FIG. 5. FIG. 2 is a flowchart of the field-of-view calibration method according to an embodiment of the present invention. FIG. 3 is a diagram of the calibration camera 22 being disposed under the illumination unit 20. FIG. 4 is a diagram of the illumination unit 20 in FIG. 1 being deflected relative to the photographic device 12. FIG. 5 is a diagram of the calibration photographic field-of-view of the calibration photographic device overlapping with the photographic field-of-view of the photographic device 12. The field-of-view calibration method of the present invention includes the following steps.

Step 200: Connect the calibration photographic device 16 to the illumination device 14 to make the calibration photographic field-of-view of the calibration photographic device 16 overlap with the illumination field-of-view of the illumination device 14 and make the calibration photographic device 16 move together with the illumination device 14.

Step 202: Utilize the comparing unit 18 to compare an image captured by the photographic device 12 with at least one image captured by the calibration photographic device 16, so as to assist the illumination device 14 and the calibration photographic device 16 to rotate together relative to the photographic device 12 to a position where the calibration photographic field-of-view of the calibration photographic device 16 at least partially overlaps with the photographic field-of-view of the photographic device 12.

More detailed description for the aforesaid steps is provided as follows in the condition that the illumination unit 20 as shown in FIG. 4 is deflected relative to the photographic device 12. In Step 200, when the user wants to perform field-of-view calibration of the illumination device 14, the user just needs to connect the calibration camera 22 to the corresponding illumination unit 20, for making the calibration camera 22 capable of moving together with the illumination unit 20 and making a secondary calibration photographic field-of-view 23 of the calibration camera 22 substantially overlap with a secondary illumination field-of-view 21 of the illumination unit 20 (as shown in FIG. 3). Accordingly, the secondary calibration photographic field-of-view 23 of the calibration camera 22 could be aligned with the secondary illumination field-of-view 21 of the illumination unit 20. To be noted, in practical application, the calibration camera 22 could preferably have a field-of-view adjusting function, so that the calibration camera 22 could adjust the secondary calibration photographic field-of-view 23 to overlap with the secondary illumination field-of-view 21 if the secondary calibration photographic field-of-view 23 is different from the secondary illumination field-of-view 21.

In Step 202, the user could compare the image displayed on the comparing unit 18 with the image captured by the photographic device 12 (e.g. by his naked eyes or utilizing the image comparing software in the comparing unit 18 to compare the image captured by the photographic device 12 with the image captured by the calibration camera 22), to determine that the image capturing region of the calibration camera 22 does not cover the image capturing region of the photographic device 12 (as shown in FIG. 4), meaning that the illumination range of the illumination unit 20 does not fall within the image capturing region of the photographic device 12. At this time, the user could rotate the calibration camera 22 and the illumination unit 20 from the deflection position as shown in FIG. 4 relative to the photographic device 12, until the user determines that the secondary calibration photographic field-of-view 23 of the calibration camera 22 has at least partially overlapped with the photographic field-of-view 13 of the photographic device 12. For example, as shown in FIG. 5, the secondary calibration photographic field-of-views 23 of the two calibration cameras 22 cooperatively form the calibration photographic field-of-view of the calibration photographic device 16 to substantially overlap with the photographic field-of-view 13 of the photographic device 12, meaning that the secondary illumination field-of-views 21 of the two illumination units 20 cooperatively form the illumination field-of-view of the illumination device 14 to substantially overlap with the photographic field-of-view 13 of the photographic device 12. In such a manner, illumination light of the illumination device 14 could be surely projected to the image capturing range of the photographic device 12, so as to provide sufficient illumination to the surveillance region (e.g. road at night, parking lot, etc.) monitored by the photographic device 12 for improving the image capturing quality of the photographic device 12.

It should be mentioned that amount of the illumination unit and the calibration camera is not limited to the aforesaid embodiment and could vary according to the practical application of the illumination apparatus. For example, in another embodiment, the illumination device could be one single illumination unit and its illumination field-of-view is substantially equal to the photographic field-of-view of the photographic device, and the calibration photographic device could be one single calibration camera and its calibration photographic field-of-view could substantially overlap with the illumination field-of-view of the illumination device. Accordingly, the user could rotate the calibration photographic device and the illumination device relative to the photographic device to a position where the calibration photographic field-of-view of the calibration photographic device at least partially overlap with the photographic field-of-view of the photographic device. In such a manner, illumination light of the illumination device could be surely projected to the image capturing range of the photographic device, so as to provide sufficient illumination to the surveillance region (e.g. road at night, parking lot, etc.) monitored by the photographic device for improving the image capturing quality of the photographic device. As for other derived embodiments (e.g. the illumination device includes three illumination units and the calibration photographic device includes three calibration cameras), the related description could be reasoned by analogy according to the aforesaid embodiments and omitted herein.

Furthermore, the comparing unit 18 could be an omissible component for simplifying the design of the illumination apparatus 10. That is to say, in another embodiment that the comparing unit 18 is omitted, the user could directly determine that the image capturing region of the calibration photographic device does not overlap with the image capturing region of the photographic device according to the image captured by the calibration photographic device (e.g. determining whether the image captured by the calibration photographic device corresponds to the surveillance region (e.g. road at night, parking lot, etc.) monitored by the photographic device by his naked eyes) or not, and could rotate the calibration photographic device and the illumination device relative to the photographic device until the image captured by the calibration photographic device at least partially corresponds to the surveillance region monitored by the photographic device (e.g. the image captured by the calibration camera corresponds to the right half portion or the left half portion of the surveillance region monitored by the photographic device). As for other related description, it could be reasoned by analogy according to the aforesaid embodiments and omitted herein.

Compared with the prior art, the present invention adopts the design for substantially overlapping the illumination field-of-view of the illumination device with the calibration photographic field-of-view of the calibration photographic device and adjusting the calibration photographic field-of-view of the calibration photographic device moving together with the illumination device to at least partially overlap with the photographic field-of-view of the photographic device, so that the user could quickly rotate the illumination device to a position where the illumination field-of-view of the illumination device overlaps with the photographic field-of-view of the photographic device. Accordingly, the user could conveniently complete the operation for mounting the illumination device on the photographic device to provide sufficient illumination to the surveillance region monitored by the photographic device. In such a manner, the present invention could efficiently solve the prior art problem that the illumination adjusting process of the photographic device is time-consuming and strenuous, especially when the illumination adjusting process is performed at the daytime, so as to greatly improve convenience of the photographic device in mounting the illumination device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A field-of-view calibration method applied to illumination calibration of an illumination device, the illumination device being pivoted to a side of a photographic device, the field-of-view calibration method comprising:
   connecting a calibration photographic device to the illumination device to make a calibration photographic field-of-view of the calibration photographic device substantially overlap with an illumination field-of-view of the illumination device and make the calibration photographic device move together with the illumination device; and
   utilizing a comparing unit to compare an image captured by the photographic device with at least one image captured by the calibration photographic device, so as to assist the illumination device and the calibration photographic device to rotate together relative to the photographic device to a position where the calibration photographic field-of-view at least partially overlaps with the photographic field-of-view.

2. The field-of-view calibration method of claim 1, wherein when the calibration photographic field-of-view is different from the illumination field-of-view, the calibration photographic device adjusts the calibration photographic field-of-view to make the calibration photographic field-of-view substantially overlap with the illumination field-of-view.

3. The field-of-view calibration method of claim 1, wherein the comparing unit is a hand-held monitor device for displaying the at least one image captured by the calibration photographic device, and the illumination device and the calibration photographic device rotate together relative to the photographic device to the position where the calibration photographic field-of-view at least partially overlaps with the photographic field-of-view according to a comparison result of the at least one image displayed by the hand-held monitor device and the image captured by the photographic device.

4. An illumination apparatus applied for providing illumination to a photographic device, the photographic device having a photographic field-of-view, the illumination apparatus comprising:
   an illumination device pivoted to a side of the photographic device, the illumination device having an illumination field-of-view;

a calibration photographic device having a calibration photographic field-of-view, the calibration photographic device being connected to the illumination device to make the calibration photographic field-of-view substantially overlap with the illumination field-of-view and make the calibration photographic device move together with the illumination device; and a comparing unit coupled to the photographic device and the calibration photographic device, for comparing an image captured by the photographic device with at least one image captured by the calibration photographic device so as to assist the illumination device and the calibration photographic device to rotate together relative to the photographic device to a position where the calibration photographic field-of-view at least partially overlaps with the photographic field-of-view.

5. The illumination apparatus of claim 4, wherein the calibration photographic device is detachably connected to a side of the illumination device.

6. The illumination apparatus of claim 4, wherein the calibration photographic device is disposed in the illumination device.

7. The illumination apparatus of claim 4, wherein when the calibration photographic field-of-view is different from the illumination field-of-view, the calibration photographic device adjusts the calibration photographic field-of-view to make the calibration photographic field-of-view substantially overlap with the illumination field-of-view.

8. The illumination apparatus of claim 4, wherein the illumination device comprises at least two illumination units, the at least two illumination units have a secondary illumination field-of-view respectively for forming the illumination field-of-view, the calibration photographic device comprises at least two calibration cameras, the at least two calibration cameras have a secondary calibration photographic field-of-view respectively for forming the calibration photographic field-of-view, the at least two calibration cameras are connected to the at least two illumination units respectively to make the secondary calibration photographic field-of-view of each calibration camera substantially overlap with the secondary illumination field-of-view of the corresponding illumination unit and make the calibration camera move together with the illumination unit, and the comparing unit is used for comparing the image captured by the photographic device with the at least one image captured by the at least two calibration cameras, so as to assist the at least two illumination units to rotate relative to the photographic device respectively to the position where the calibration photographic field-of-view at least partially overlaps with the photographic field-of-view.

9. The illumination apparatus of claim 4, wherein the comparing unit is a hand-held monitor device for displaying the at least one image captured by the calibration photographic device, and the illumination device and the calibration photographic device rotate together relative to the photographic device to the position where the calibration photographic field-of-view at least partially overlaps with the photographic field-of-view according to a comparison result of the at least one image displayed by the hand-held monitor device and the image captured by the photographic device.

* * * * *